ન3,444,237
ESTERS OF CYCLOHEXANE-1,2,4-
TRICARBOXYLIC ACID
Fred Jaffe, Cincinnati, Ohio, assignor to W. R. Grace &
Co., New York, N.Y., a corporation of Connecticut
No Drawing. Filed Mar. 23, 1966, Ser. No. 536,658
Int. Cl. C07c 69/74, 51/36; C08f 45/40
U.S. Cl. 260—468                                3 Claims

ABSTRACT OF THE DISCLOSURE

In abstract, this invention is directed to a compound having the formula

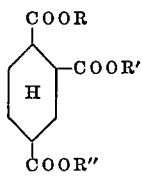

in which R, R', and R" are each $C_nH_{2n+1}$ in which $n$ is 6–16.

---

This invention relates to trimellitic acid. More particularly, this invention relates to a process for hydrogenating trimellitic acid.

In summary, this invention relates to a process for hydrogenating trimellitic acid to yield mixed isomers of cyclohexane-1,2,4-tricarboxylic acids comprising: (a) preparing a solution of an alkali salt of said acid by reacting trimellitic anhydride with about a 5–20 percent solution of an alkali selected from the group consisting of sodium hydroxide, potassium hydroxide, lithium hydroxide, ammonium hydroxide, sodium carbonate and potassium carbonate in the mole ratio of about 3.3–4 moles of said alkali per mole of said anhydride; (b) adding thereto a hydrogenation catalyst consisting essentially of about 2–10 parts of metallic ruthenium per 98–90 parts of activated carbon carrier at the rate of about 2–25 g. of said catalyst per mole of trimellitic anhydride, whereby a catalyst-containing slurry is prepared; (c) hydrogenating the thus formed slurry with elemental hydrogen at a pressure of about 1800–4000 pounds per square inch gauge at a temperature of about 100–150° C. until hydrogenation is substantially complete, whereby the aforesaid alkali metal salt is hydrogenated to form an aqueous solution of salts of the mixed isomers of cyclohexane-1,2,4-tricarboxylic acid; (d) relieving the pressure on the thus hydrogenated mixture to about atmospheric pressure and cooling said mixture to about 15–35° C.; adjusting the pH of said mixture to about 1–2 with a strong acid; and (e) separating and recovering the thus formed mixed isomers of cyclohexane-1,2,4-tricarboxylic acid.

It is an object of this invention to provide a process for hydrogenating salts of trimellitic acid. It is another object of this invention to prepare the mixed isomers of cyclohexane-1,2,4-tricarboxylic acids by the catalytic hydrogenation of salts of trimellitic acid. Other objects will be readily apparent to those skilled in the art.

The mixed cyclohexane - 1,2,4 - tricarboxylic acids (mixed hexahydrotrimellitic acids) prepared by the method of this invention are useful articles. I have found that these mixed acids are especially useful in the manufacture of esters (especially the octyl esters) which, as I have found, are excellent plasticizers for plastics including poly(vinyl chloride).

Prior to my invention, the preparation of mixed or isometric hexahydrotrimellitic acids from trimellitic acid was unknown. I have found that the hydrogenation of alkali metal salts of trimellitic acid with hydrogen in the presence of Raney nickel catalyst is extremely sluggish and incomplete even when using highly purified trimellitic acid as a starting material. When attempting this method of hydrogenating trimellitic acid I was never successful in obtaining more than about trace quantities of the desired isomeric hexahydrotrimellitic acids.

Several attempts to hydrogenate trimellitic acid in aqueous solution using metallic ruthenium, or metallic ruthenium supported on activated carbon (charcoal) as catalysts were unsuccessful. Instead of obtaining the desired hexahydrotrimellitic acids in good yield, I obtained only trace quantities of these materials plus various degradation products of trimellitic acid plus tars and similar undesirable products. Substantially the same unsatisfactory results were obtained when I attempted the hydrogenation of trimellitic acid dissolved in acetic acid using ruthenium or ruthenium supported on carbon (charcoal) as catalysts. Since these methods are usually very efficient means for hydrogenating aromatic rings, their failure to reduce the aromatic ring of trimellitic acid to the cyclohexane type ring was completely unexpected.

In view of the negative results of my early experiments, as reported supra, my subsequent finding that an alkali metal salt, or an ammonium salt, of trimellitic acid in aqueous solution can be readily hydrogenated by treating an aqueous solution of said salt with a gas containing free hydrogen in the presence of a catalyst consisting of metallic ruthenium supported on activated carbon (e.g., activated charcoal) is completely unobvious and unexpected. I found that a mixture of the isomeric hexahydrotrimellitic acids can be obtained in substantially theoretical yield by hydrogenating an alkali metal salt or ammonium salt of trimellitic acid, with said salt dissolved in water to form an aqueous solution thereof, in the presence of a catalyst consisting essentially of about 2–10 parts of metallic ruthenium supported on about 98–90 parts of an activated carbon (e.g., activated charcoal) support. I have found that the aforesaid catalyst should generally be employed in a ratio of about 5–20 g. of catalyst per mole of trimellitic anhydride. The use of greater (or smaller) ratios of catalyst to salt of trimellitic acid results in faster (or slower) rates of hydrogenation.

In the process of this invention an alkali salt or trimellitic acid is prepared by treating an aqueous suspension of said acid or an aqueous suspension of trimellitic anhydride with an alkali metal hydroxide or an alkali metal carbonate or with ammonium hydroxide in sufficient quantity to dissolve the acid (or anhydride) and substantially neutralize the trimellitic acid (or trimellitic anhydride). Alkali metal hydroxides suitable for the use in this process include sodium hydroxide, potassium hydroxide, and lithium hydroxide; ammonium hydroxide can also be used with excellent results; hence, for the purpose of this invention, it can be regarded as an alkali metal hydroxide. Alkali metal carbonates suitable for the use in the process of this invention include sodium carbonate and potassium carbonate. Since lithium carbonate is relatively insoluble I prefer to avoid its use. Also, because of the low solubility of lithium carbonate, I prefer to avoid mixing other alkali metal carbonates with a system in which lithium hydroxide is present. Since trimellitic anhydride is a convenient starting material, I prefer to use it as a source of trimellitic acid. Upon adding said anhydride to an aqueous alkali I obtained a solution suitable for use in the process of this invention. After preparing the aforesaid solution of an alkali metal or ammonium salt of trimellitic acid I added thereto a hydrogenation catalyst consisting essentially of about 2–10 parts of ruthenium metal per 98–90 parts of a carbon carrier. While I prefer to use activated charcoal as a carbon carrier, I have found that other activated carbons such as those derived from bituminous coal are suitable carriers. I prefer to use this catalyst at the rate of about 5–15 g. of catalyst per mole of trimellitic anhydride, however, I have obtained excellent results using about 2–25 g. of catalyst per mole of said anhydride. While I prefer to use substantially pure hydrogen in the hydrogenation of the catalyst-containing aqueous solution, I have found that gases rich in hydrogen can be used for this purpose providing they are substantially free of hydrogen sulfide, hydrogen cyanide, and mercaptans. Many industrial gases, including gas from the coking of pitch, can be used providing such gas is substantially free of hydrogen sulfide, mercaptans, and hydrogen cyanide. I prefer to conduct the hydrogenation in a high pressure autoclave at a pressure of about 2300–2600 lbs. per square inch gauge pressure; however, I have obtained excellent results using pressures of about 1800–4000 lbs. per square inch. Temperatures of about 110–130° C. are preferred, but I have obtained excellent results with temperatures ranging from about 100–150° C. When hydrogenation is substantially complete, as indicated by the failure of the solution to absorb more hydrogen added to the system, I relieve the pressure on the thus hydrogenated mixture to about atmospheric pressure and at the same time cool the reaction product to about 15–35° C. I then recover the product from the solution. This can be done by filtering the catalyst from the liquid phase or by centrifuging the mixture and decanting the supernatant liquor from the solid catalyst. Alternatively, the mixture can be placed in a settling vat and allowed to settle after which the supernatant liquor is withdrawn from the solid catalyst. The catalyst can be recovered and reused. Alternatively, the catalyst can be left in the hydrogenated mixture during acidification. When this procedure is used, the catalyst remains in the aqueous phase when the mixed acids (mixed isomers of cyclohexane-1,2,4-tricarboxylic acid) are extracted with an organic solvent—see Example I for details. Other methods of separating the catalyst from the aqueous phase which contains the salts of the thus produced mixed isomers of cyclohexane-1,2,4-tricarboxylic acid will be readily apparent to those skilled in the art. I convert the salts of the aforesaid acids to the free mixed acids by treating the aqueous solution of the alkali metal salts of said mixed acids with a mineral acid. Although I prefer to use hydrochloric acid for this purpose I have found that I can obtain excellent results with substantially any strong acid including sulfuric and phosphoric acids. I have found that by adding strong acid until the pH of the slurry formed by addition of said strong acid is about 1–2 a very good yield of high quality product is obtained. However, I prefer to adjust the pH, via the addition of the aforesaid strong acid, to a value of about 2. Some of the thus formed mixed acids (i.e., mixed isomers of cyclohexane-1,2,4-tricarboxylic acid) can be separated and recovered from the mother liquor by filtering, by centrifuging, or by decanting. However, I prefer to extract said mixed acids from the aqueous mother liquor with an organic solvent which is only slightly soluble in said mother liquor. Examples of such solvents are methyl ethyl ketone, diethyl ketone, and ethyl acetate; other suitable solvents will be readily apparent to those skilled in the art. The thus separated mixed acids can be readily separated from the organic solvent by distilling the solvent from the mixed acids or by partially evaporating the organic solvent and crystallizing the acids from the solvent (by decreasing the temperature of the liquid). Other methods recovering the acids will be readily apparent to those skilled in the art.

As used in this specification and the claims appended thereto, the term "parts" means parts by weight unless otherwise defined where used, and the term "percent" means percent by weight. The term "mole" means gram mole (i.e., molecular weight expressed in grams) unless otherwise defined where used. The term "activated carbon" as used in the specification and claims of this application means "active carbon" which is carbon characterized by high adsorptive capacity for gases, vapors, and colloidal solids. (Details concerning the preparation of activated carbon are given on page 22 of the sixth edition of "The Condensed Chemical Dictionary," by Arthur and Elizabeth Rose, Reinhold Publishing Corporation and on pages 886–888 of volume 2 of the first edition of "Encyclopedia of Chemical Technology" by Kirk and Othmer, The Interscience Encyclopedia, Inc.)

The invention of this application will be further understood by referring to the following specific but nonlimiting examples.

EXAMPLE I

A solution of the sodium salt trimellitic acid was prepared by dissolving about 200 g. (1.04 mole) of trimellitic anhydride in about 1300 ml. of 10% sodium hydroxide solution; 10 g. of a catalyst consisting essentially of about 5 parts by weight of metallic ruthenium on about 95 parts of activated carbon was added to the aforesaid solution. The mixture of solution and catalyst was placed in an autoclave and hydrogenated, using substantially pure hydrogen, at a temperature of about 120° C. and at a pressure of about 2,400 lbs. per square inch gauge until the reaction was substantially complete (i.e., until the absorption of hydrogen had ceased). The autoclave was cooled to about room temperature (ca. 22° C.) and vented to reduce the pressure therein to about atmospheric pressure. The solution was transferred from the autoclave to a glass container and treated with about 6 normal hydrochloric acid. Sufficient hydrochloric acid was added to adjust the pH of the acid-treated material to about 2. The thus acidified material was evaporated (on a sand bath at about 100–105° C.) until practically all liquid had been evaporated. The resulting solids were extracted with methyl ethyl ketone. The ketone solution was filtered to remove particles of catalyst and the filtrate was evaporated to dryness on a sand bath maintained at about 100° C. The thus obtained product was dried at about 110° C. for about five hours. This material had a neutralization equivalent of 75.4 which corresponds to a molecular weight of about 226 (theoretical molecular weight, 216). Yield of the mixed isomers of cyclohexane-1,2,4-tricarboxylic acid was substantially theoretical.

A portion of the dried product was esterified in a conventional manner with boron trifluoride-methanol reagent. The thus produced mixture of methyl ester was analyzed by a conventional gas chromatography technique using a temperature programmed gas chromatograph apparatus of conventional design. The sample showed 3 main peaks and only trace amounts (less than 1% by weight) of three additional peaks, thereby confirming that the hydrogenated acid, from which the mixture of methyl esters was prepared, consisted of a substantially pure mixture of three of the possible isomers of cyclohexane-1,2,4-tricarboxylic acid.

EXAMPLE II

A 200 g. sample of trimellitic anhydride was placed in an autoclave with 1900 ml. of water (ca. 75–80° C.). A 10 gram portion of a catalyst consisting of 5 parts of metallic ruthenium on 95 parts of activated carbon (charcoal) was added to the mixture which was then hydrogenated by the general process of Example I (but omitting the addition of sodium hydroxide). At the end of the hydrogenation, the product was processed by the same procedure used in Example I. A sample of the final product was esterified with boron trifluoride-methanol reagent and analyzed by conventional gas chromatography using the same technique as was used in Example I. The example showed twelve main peaks, thereby showing the presence of twelve principal products.

EXAMPLE III

The general procedure of Example II was repeated but in this instance the solvent used was a mixture of 170 parts water and 1350 parts of glacial acetic acid. In this instance gas chromatography of the esterified final product showed fifteen peaks, thereby signifying the presence of fifteen principal products in the reaction mixture.

The results of Examples II and III show that hydrogenation of trimellitic acid with a ruthenium catalyst on an activated carbon support is not a satisfactory procedure for preparing a mixture of the isomers of cyclohexane-1,2,4-tricarboxylic acid. The results of Examples II and III are compared with the results of Example I, it becomes readily apparent that the excellent results obtained by the hydrogenation of the salt of trimellitic acid rather than the free acid is surprising and completely unexpected.

EXAMPLE IV

A 0.5 mole portion of the mixed cyclohexane-1,2,4-tricarboxylic acids prepared according to the method of Example I was placed in a round-bottomed flask, and 3 moles of n-octyl alcohol was added to the flask. Then a small portion (ca. 20 ml. of toluene) was added. The flask was fitted with a Dean Stark trap (to remove water) and a reflux condenser was attached. The mixture was heated to about 150° C. until the acid number of the mixture was about 0.3 or less. The excess octyl alcohol was distilled from the system and the octyl esters of the mixed acids were recovered.

It was found that said esters were excellent plasticizers for plastics, especially poly(vinyl chloride).

Esters of other 8-carbon alcohols were prepared by the general method described above. In each instance the esters of the mixed acids were found to be excellent plasticizers for poly(vinyl chloride) and other plastics.

EXAMPLE V

The general method of Example IV was used to prepare the decyl esters of the mixed cyclohexane-1,2,4-tricarboxylic acids. The procedure was the same as that of Example IV except n-decyl alcohol was used in place of octyl alcohol. The resulting esters were tested and found to be excellent plasticizers for plastics including poly(vinyl chloride).

Esters were prepared from the other decyl alcohols by the same general procedure. In each instance the esters of the mixed cyclohexane-1,2,4-tricarboxylic acids were excellent plasticizers especially for poly(vinyl chloride) plastic.

I have also found that any high molecular weight alcohol can be used to make esters by the general procedure of Example V and that such esters are excellent plasticizers for poly(vinyl chloride) and other plastics. However, economic factors govern, and only those high molecular alcohols (or mixtures of such alcohols) which are commercially available at relatively low cost are economically attractive for preparing esters of the mixed cyclohexane-1,2,4-tricarboxylic acids.

As used herein the term "high molecular weight alcohols" means alkanols having about 6–16 carbon atoms per molecule. Thus, compounds having the formula

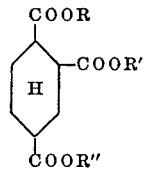

in which R, R′, and R″ are each $C_nH_{2n+1}$ in which $n$ is 6–16 fall within the scope of my invention.

What is claimed is:
1. A compound of the formula

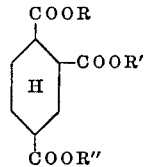

in which R, R′, and R″ are each $C_nH_{2n+1}$ in which $n$ is 6–16.
2. The compound of claim 1 in which $n$ is 8.
3. The compound of claim 1 in which $n$ is 10.

References Cited

Achmatowicz, O. et al.: Bulletin De L'Academie Polonaise Des Sciences, Cl. III, vol. III, No. 10, 1955 (pp. 557–564).

Dougherty P. C., et al.: Technical Papers (Society of Plastic Engineers, Inc.), paper #22, pp. 1–9, Feb. 2, 1962.

LORRAINE A. WEINBERGER, *Primary Examiner.*

P. J. KILLOS, *Assistant Examiner.*

U.S. Cl. X.R.

260—31.8, 514